E. E. EBY & S. W. FARNSWORTH.
WELDING SYSTEM.
APPLICATION FILED OCT. 15, 1914.

1,229,727.

Patented June 12, 1917.

WITNESSES:
P. J. Fitzgerald
R. D. Brown

INVENTORS
Earl E. Eby
& Sidney W. Farnsworth.
BY
Wesley G. Carr
ATTORNEY

UNITED STATES PATENT OFFICE.

EARL E. EBY, OF WILKINSBURG, AND SIDNEY W. FARNSWORTH, OF PITTSBURGH, PENN-
SYLVANIA, ASSIGNORS TO WESTINGHOUSE ELECTRIC AND MANUFACTURING COM-
PANY, A CORPORATION OF PENNSYLVANIA.

WELDING SYSTEM.

1,229,727.  Specification of Letters Patent.  Patented June 12, 1917.

Application filed October 15, 1914. Serial No. 866,789.

*To all whom it may concern:*

Be it known that we, EARL E. EBY, a citizen of the United States, and a resident of Wilkinsburg, in the county of Allegheny and State of Pennsylvania, and SIDNEY W. FARNSWORTH, a citizen of the United States, and a resident of Pittsburgh, in the county of Allegheny and State of Pennsylvania, have invented a new and useful Improvement in Welding Systems, of which the following is a specification.

Our invention relates to welding systems, and it has special reference to electric arc welding systems which are adapted for use with alternating-current supply, and in which current rectifiers are employed to convert the alternating current into direct current for the welding circuit.

The object of our invention is to provide a system of the character above indicated which shall be simple in arrangement, inexpensive in construction and highly efficient in operation.

Figure 1:
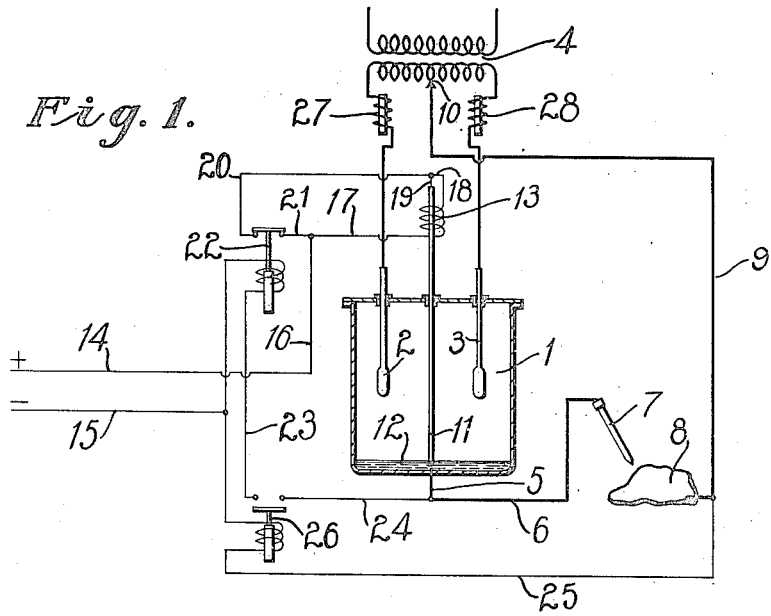
Figure 2:
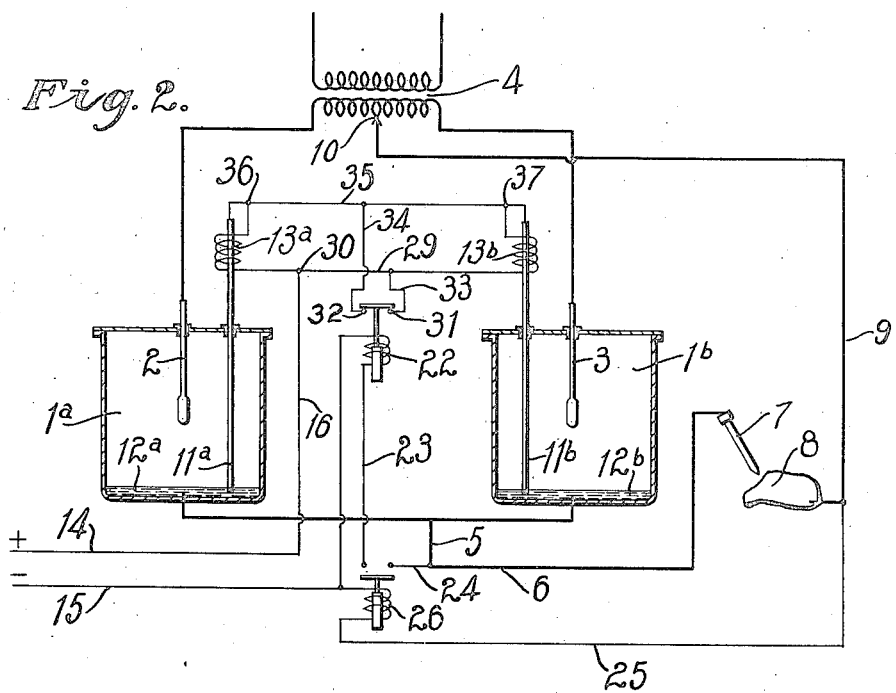

In the accompanying drawing, Figure 1 is a diagrammatic view showing a welding system constructed in accordance with our invention, and Fig. 2 is a diagrammatic view showing a modification of the system illustrated in Fig. 1.

When arc welding is to be performed under circumstances where the available current is alternating, it is customary to convert such alternating current into direct current by means of a motor-generator set and to interpose a large amount of resistance in the direct current welding circuit for the purpose of preventing surges of current when the welding electrode is brought into contact with the work, and also in order to maintain a stable arc during the welding operation. The use of such high resistance entails expensive power losses, on account of the voltage drop across the resistance and the heavy currents which are usually employed in arc welding service. It is therefore advantageous to substitute other current-controlling means for such power-consuming resistance, and we have discovered that the welding current can be properly supplied and controlled by the use of current rectifiers, preferably of the mercury-vapor type, in which an auxiliary circuit is employed for maintaining the rectifier arc.

According to our present invention, the current in the auxiliary rectifier circuit is employed to draw a preliminary arc between the welding electrode and the work, the main welding current being prevented from flowing until such preliminary or pilot arc is established. In one modification of our invention, the main direct-current circuit is automatically interrupted as soon as the welding electrode is brought into contact with the work, and destructive rushes of current will therefore be avoided, both when the arc is struck at the beginning of the welding operation and when the electrode is thereafter brought into contact with the work.

For a better understanding of our invention, reference may now be had to the accompanying drawing, in which a rectifier 1, provided with main electrodes 2 and 3, is supplied with alternating current from a transformer 4, the terminals of which are connected to the electrodes 2 and 3 in the usual manner. The direct current delivered by the rectifier 1 is transmitted, through conductors 5 and 6, to a welding electrode 7 which coöperates with a metallic object 8. The object 8 represents the work to be welded and is connected, by means of a conductor 9 to the neutral point 10 of the transformer 4.

The rectifier 1 is provided with an auxiliary starting and keeping-alive electrode 11, the lower end of which is adapted to be immersed in the mercury cathode 12 of the rectifier and to be withdrawn therefrom by the action of a solenoid 13 which surrounds the upper portion of the keeping-alive electrode.

An auxiliary source of direct current supplies energy for operating the solenoid 13 and for establishing a preliminary or pilot arc between the electrodes 7 and 8. The positive and negative terminals of this direct-current source are indicated at 14 and 15, respectively. The positive terminal 14 of the auxiliary circuit is connected to one terminal of the solenoid 13 by means of conductors 16 and 17, and the other terminal of the solenoid 13 is connected to the keeping-alive electrode 11 by means of conductors 18 and 19. A shunt around the solenoid 13 is provided by means of conductors 20 and 21, and this shunt is adapted to be closed or opened by means of a relay 22, the energizing solenoid of which is connected in parallel across the electrodes 7 and 8, being connected to the conductor 6 by means of conductors 23 and 24 and with the conductor 9 by means of a conductor 25. Connection between the conductors 23 and 24 may be established or interrupted by means of a relay 26, the energizing solenoid of which is connected in series in the conductor 25. In order to stabilize the arc during the welding operation, reactance coils 27 and 28 may be interposed in the conductors which connect the terminals of the transformer 4 to the rectifier anodes 2 and 3.

In beginning the operation of this form of our system, the relay 22 is closed, the relay 26 is open and the auxiliary rectifier electrode 11 is in its lower position, its point being immersed in the mercury cathode 12. The alternating-current supply switch and the auxiliary direct-current supply switch are then closed, and the pencil 7 is brought into contact with the work, thereby establishing a circuit from the direct-current source of supply through conductors 14, 16 and 21, relay 22, conductors 20 and 19, the keeping-alive electrode 11, the mercury electrode 12, conductors 5 and 6, welding electrodes 7 and 8 and conductors 25 and 15. Since the current is shunted around the solenoid 13, the keeping-alive electrode 11 will remain immersed in the mercury cathode 12, and the main rectifier arcs will not be established. The flow of current through the conductor 25 energizes the solenoid of the relay 26, thereby causing the relay to close and connect the terminals of the conductors 23 and 34. The solenoid coil of the relay 22 is thus electrically connected in parallel across the electrode 7 and the work 8. The electrode 7 is next withdrawn from the work a short distance, and the small auxiliary direct current of 5 or 10 amperes, flowing through the circuit described above, draws a small preliminary welding arc. The voltage across this pilot arc then operates the solenoid coil of relay 22 and causes the relay to open, thus interrupting the shunt around the solenoid 13 and allowing the auxiliary keeping-alive current to pass through the solenoid 13 and raise the keeping-alive electrode 11. The keeping-alive arc is thereupon established between the anode 11 and the mercury cathode 12, which puts the main rectifier arcs into operation and supplies the main direct current to the welding arc. The welding operation then proceeds, the arc being maintained in a stable condition by means of the balancing reactance coils 27 and 28, or other reactance devices in the alternating current circuit, which reactance devices tend to prevent surges of current at the welding electrodes when the pencil 7 is brought into contact with the work.

It will be obvious from the foregoing description that excessive currents are restrained from flowing through the welding electrode and the work both at the beginning of the welding operation and when the pencil is momentarily touched to the work during the welding process. If it is desired to avoid entirely the possibility of such heavy currents, even when the pencil is left in continuous contact with the work, we prefer to make use of the modified arrangement shown in Fig. 2.

The arrangement shown in Fig. 2 differs from that shown in Fig. 1 in that the main rectifier anodes 2 and 3 are inclosed in separate compartments $1^a$ and $1^b$, which are provided with keeping-alive electrodes $11^a$ and $11^b$, respectively. The provision of two separate keeping-alive electrodes renders necessary a special set of connections, by means of which the currents through the keeping-alive electrodes and their operating solenoids are controlled in a manner similar to that described in connection with the system shown in Fig. 1. The solenoids $13^a$ and $13^b$ which operate to raise the keeping-alive electrodes $11^a$ and $11^b$, respectively, are connected in parallel with each other by means of a conductor 29, and one terminal of the parallel combination so produced is connected at 30 with the conductor 16. The terminal 31, which is one of the terminals that are adapted to be closed and opened by means of the relay 22, is connected to the conductor 29 by means of a conductor 33, and the other terminal 32 is connected, by means of a conductor 34, to a conductor 35, the ends of which are connected to the keeping-alive electrodes $11^a$ and $11^b$. The upper terminals of the solenoids $13^a$ and $13^b$ are joined to the conductor 35 at 36 and 37, respectively. The remaining parts of the system shown in Fig. 2 are identical with that shown in Fig. 1 and are correspondingly designated.

Direct current, entering the system through the conductor 14, passes through the conductor 16 and, the relay 22 being closed, passes through the conductors 29 and 33, terminals 31 and 32, and conductor 34 to the point of connection between the conductors 34 and 35, where the current divides, part passing through the anode $11^a$ and the remainder through the anode $11^b$. The pilot arc is then established between the pencil 7 and the work, as in the first modification of our system, and, when the solenoid of the relay 22 is energized by reason of the voltage across the pilot arc, and the terminals 31 and 32 of the conductors 33 and 34 are thereby disconnected, the auxiliary direct current will pass through the conductors 14 and 16 to the point of connection 30 where it will divide, part of the current passing through the solenoid 13ª to the point 36, and the remainder through the solenoid 13ᵇ to the point 37, thereby drawing starting arcs in each of the rectifier units 1ª and 1ᵇ and causing the rectifying operation to begin. If the electrode 7 is brought into contact with the work 8 during the welding operation, the main direct current delivered by the rectifier units will instantly stop because the relay 22 will be deënergized as soon as the welding arc is interrupted and will thereupon close, thus shunting the auxiliary current around the solenoids 13ª and 13ᵇ and permitting the auxiliary anodes 11ª and 11ᵇ to drop back into the mercury cathodes.

It is obvious that numerous modifications and structural changes may be made in the systems which we have shown and described without departing from the spirit of our invention, and we therefore desire it to be understood that no limitations are to be imposed upon our invention other than those indicated in the appended claims.

We claim as our invention:

1. An arc welding system comprising welding electrodes, a main welding circuit including the said electrodes, auxiliary means for supplying current to establish a preliminary arc between the said electrodes, and means operated by the tension across the said preliminary arc for energizing the said main welding circuit.

2. An arc welding system comprising welding electrodes, a main welding circuit including the said electrodes and a vapor rectifier, an auxiliary rectifier-starting circuit and means for establishing a preliminary arc between the said electrodes by means of the current in the said rectifier starting circuit and for thereafter starting the rectifier and thereby energizing the main welding circuit.

3. An arc welding system comprising a source of alternating-current supply, a vapor rectifier having main electrodes and an auxiliary starting electrode, a main welding circuit adapted to receive direct current from the said rectifier, and an auxiliary circuit for establishing a preliminary welding arc and for thereafter starting the said rectifier.

4. An arc welding system comprising a source of alternating-current supply, a vapor rectifier having main electrodes and an auxiliary starting electrode, a main welding circuit adapted to receive direct current from the said rectifier, an auxiliary circuit for drawing a preliminary welding arc and for thereafter starting the said rectifier, and a reactance device interposed between the said source of alternating-current supply and the said rectifier.

5. An arc welding system comprising a source of alternating-current supply, a vapor rectifier having main electrodes and an auxiliary starting electrode, an auxiliary circuit including the said auxiliary electrode and means for moving the said auxiliary electrode under predetermined conditions to start the said rectifier, welding electrodes, means for supplying direct current from the said rectifier to the said electrodes, means for supplying current from the said auxiliary circuit to the said welding electrodes for establishing a preliminary arc therebetween, and means operated by the tension across the said preliminary arc for energizing the said electrode-operating means, whereby the rectifier is started and the main welding current supplied to the said electrodes.

6. An arc welding system comprising a source of alternating-current supply, a vapor rectifier having main electrodes and an auxiliary starting electrode, a main welding circuit adapted to receive direct current from the said rectifier and an auxiliary circuit for establishing a preliminary welding arc and for starting the said rectifier, the said auxiliary circuit comprising means for operating the auxiliary rectifier electrode to start the rectifier under predetermined conditions, means for preventing the operation of the auxiliary rectifier electrode under other predetermined conditions, and means operated by the tension across the said preliminary welding arc for permitting the operation of the said starting electrode.

7. An arc welding system comprising a source of alternating-current supply, a vapor rectifier having main electrodes and an auxiliary starting electrode, a main welding circuit adapted to receive direct current from the said rectifier, and an auxiliary circuit for establishing a preliminary welding arc and for starting the said rectifier, the said auxiliary circuit comprising means for causing the said auxiliary rectifier electrode to start the rectifier, means for preventing the operation of the said auxiliary electrode until the said preliminary welding arc is established, and means operated by the tension across the said preliminary welding arc for permitting the said auxiliary electrode to operate.

8. An arc welding system comprising a source of alternating-current supply, a vapor rectifier having main electrodes and an auxiliary starting electrode, a main welding circuit adapted to receive direct current from the said rectifier, and an auxiliary circuit for establishing a preliminary welding arc and for starting the said rectifier, the said auxiliary circuit comprising a solenoid adapted to operate the auxiliary rectifier electrode to start the rectifier, means for preventing the operation of the said solenoid until the said preliminary welding arc is established, and means operated by the tension across the said preliminary welding arc for energizing the said solenoid.

9. An arc welding system comprising a source of alternating-current supply, a vapor rectifier having main electrodes and an auxiliary starting electrode, a main welding circuit adapted to receive direct current from the said rectifier, and an auxiliary circuit for establishing a preliminary welding arc and for starting the said rectifier, the said auxiliary circuit comprising a solenoid adapted to operate the auxiliary rectifier electrode to start the rectifier, relay-operated means for deënergizing the said solenoid until the said preliminary welding arc is established and means operated by the tension across the said preliminary welding arc for energizing the said solenoid.

10. An arc welding system comprising a source of alternating-current supply, a vapor rectifier having main electrodes and an auxiliary starting electrode, a main welding circuit adapted to receive direct current from the said rectifier, and an auxiliary circuit for establishing a preliminary welding arc and for starting the said rectifier, the said auxiliary circuit comprising a solenoid adapted to operate the auxiliary rectifier electrode to start the rectifier, relay-operated means for deënergizing the said solenoid until the said preliminary welding arc is established, and a relay operated by the tension across the said preliminary arc for operating the said first-named relay to energize the said solenoid.

11. An arc welding system comprising a source of alternating-current supply, a vapor rectifier, welding electrodes in series circuit relation to the said rectifier, and an auxiliary rectifier starting circuit associated with the said electrodes and including current-controlling means for permitting a preliminary arc to be established between the said electrodes and for thereafter permitting the rectifier to be started.

12. An arc welding system comprising a source of alternating-current supply, a vapor rectifier, welding electrodes in series circuit relation to the said rectifier, an auxiliary rectifier-starting circuit associated with the said electrodes and including a relay for permitting a preliminary welding arc to be established between the said electrodes before the rectifier is started and for afterward permitting the rectifier to be started, and a second relay in series circuit relation to the said electrodes and adapted to connect the said first-named relay in parallel circuit relation to the said electrodes, whereby the said first named relay is operated by the tension across the said preliminary arc to permit the starting of the rectifier.

13. An arc welding system comprising welding electrodes, a main welding circuit including the said electrodes, auxiliary means for supplying current to establish a preliminary arc between the said electrodes, and means operated by the tension across the said preliminary arc for energizing the said main welding circuit and for interrupting the said main welding circuit while the welding electrodes are in contact.

14. An arc welding system comprising welding electrodes, a main welding circuit including the said electrodes, means for supplying current to establish a preliminary arc between the said electrodes, means operated by the tension across the said preliminary arc for energizing the said main welding circuit, and means for interrupting the said main welding circuit while the welding electrodes are in contact.

15. An arc welding system comprising welding electrodes, a main welding circuit including the said electrodes and a plurality of vapor rectifier units, each of the said rectifier units comprising a pair of main electrodes and an auxiliary starting electrode, means for establishing a preliminary welding arc between the said welding electrodes and for thereafter energizing the said welding circuit, and means for interrupting the said main welding circuit while the welding electrodes are in contact.

16. An arc welding system comprising welding electrodes, a welding circuit including the said electrodes and means operating without the use of power-consuming resistance for preventing the flow of current of welding magnitude in the said welding circuit until the welding electrodes are brought into engagement and separated.

17. An arc welding system comprising welding electrodes, a welding circuit including the said electrodes and means operating without the use of power-consuming resistance for preventing the flow of current of welding magnitude in the said welding circuit until the welding electrodes are brought into engagement and separated to a predetermined distance.

In testimony whereof, we have hereunto subscribed our names this 29th day of September, 1914.

EARL E. EBY.
SIDNEY W. FARNSWORTH.

Witnesses:
C. KIRWER,
B. B. HINES.